(12) United States Patent
Lang, III et al.

(10) Patent No.: US 8,807,156 B2
(45) Date of Patent: Aug. 19, 2014

(54) GAS VENT VALVE

(75) Inventors: Rudolph Joseph Lang, III, St. Charles, IL (US); Anthony John Witheridge, Batavia, IL (US)

(73) Assignee: International Valve Manufacturing, L.L.C., St. Charles, IL (US)

( * ) Notice: Subject to any disclaimer, the term of this patent is extended or adjusted under 35 U.S.C. 154(b) by 158 days.

(21) Appl. No.: 13/273,889

(22) Filed: Oct. 14, 2011

(65) Prior Publication Data
US 2013/0092255 A1 Apr. 18, 2013

(51) Int. Cl.
*F16K 24/04* (2006.01)

(52) U.S. Cl.
USPC ........................................................ 137/202

(58) Field of Classification Search
USPC .................. 137/197, 199, 202, 411, 429, 430
See application file for complete search history.

(56) References Cited

U.S. PATENT DOCUMENTS

| | | | |
|---|---|---|---|
| 257,853 A * | 5/1882 | Dibble | ........................... 137/202 |
| 2,853,092 A | 9/1958 | Klikunas | |
| 4,114,641 A | 9/1978 | Robinson | |
| 4,209,032 A | 6/1980 | Drori | |
| 4,579,140 A | 4/1986 | Sekine | |
| 4,586,528 A | 5/1986 | Andres | |
| 4,635,672 A | 1/1987 | Baker | |
| 4,696,321 A | 9/1987 | Reese | |
| 4,742,843 A | 5/1988 | McClaran | |
| 5,090,439 A | 2/1992 | Sabalvaro, III | |
| 5,386,844 A | 2/1995 | Kennedy | |
| 5,511,577 A | 4/1996 | Richards | |
| 5,769,429 A | 6/1998 | Smetters | |
| 5,988,201 A | 11/1999 | Lebkuchner | |
| 6,401,741 B1 * | 6/2002 | Cain | ............................... 137/10 |
| 6,513,541 B1 | 2/2003 | Herlihy | |
| 7,617,838 B2 | 11/2009 | Katzman | |
| 2004/0107992 A1 * | 6/2004 | Richards | ........................ 137/202 |
| 2009/0139581 A1 * | 6/2009 | Herlihy | .......................... 137/202 |
| 2010/0319788 A1 * | 12/2010 | Ward | ............................. 137/202 |
| 2012/0037834 A1 * | 2/2012 | Lang et al. | .................... 251/368 |
| 2013/0220442 A1 * | 8/2013 | Balutto | ......................... 137/202 |

* cited by examiner

*Primary Examiner* — Craig Schneider
*Assistant Examiner* — Ian Paquette
(74) *Attorney, Agent, or Firm* — Edwards Wildman Palmer LLP; Christopher J. Capelli; Joshua L. Jones (57) ABSTRACT

A gas vent valve has a valve body having a first end, a second end, and a sidewall having a generally constant inner diameter from the first end to a normal operating liquid level. A spacer is positioned within the valve body and has an aperture formed therethrough. A control float is positioned within the valve body and has an outer diameter that is smaller than the inner diameter of the valve body and larger than the inner diameter of the spacer. A top float is positioned within the valve body, above the control float, and has an outer diameter that is smaller than the inner diameter of the spacer. A side port can extend from the sidewall and be positioned below the spacer and generally adjacent the top float with the valve in the open condition.

19 Claims, 9 Drawing Sheets

GAS VENT VALVE

FIELD OF THE INVENTION

The present invention generally relates to gas vent valves and, more particularly, to gas vent valves having improved air flow characteristics and having a valve body that can be considerably shortened in height while still keeping debris or water away from the sealing components during increases in pipeline pressures.

BACKGROUND

Large pipelines that supply water or transport sewerage often traverse undulating terrain. This is one reason why the proper operation of these pipelines requires the removal of air pockets that may form during operation or during the pipeline filling process. Similarly, pipelines occasionally experience negative pressures that may be due to emptying, pumping disruptions, and maintenance or failure conditions. Regardless of the reason, large diameter pipelines are prone to damage under negative pressure conditions and venting valves that allow the ingress of air can be a necessary design requirement.

The prior art shows and describes several types of pipeline venting valves. Certain of the prior art valves utilize small floats that operate the valve closure using mechanical advantage offered by sets of hinges and levers as exemplified by U.S. Pat. Nos. 4,114,641; 4,635,672; 5,090,439; 5,386,844; 5,988,201; 7,617,838; and 4,209,032. Other prior art valves avoid the maintenance problems associated with levers by using larger direct acting floats as exemplified by U.S. Pat. Nos. 5,511,577; 2,853,092; 4,579,140; 4,586,528; 4,696,321; 4,742,843; and 5,769,429, or have multiple venting modes that allow large flow rates of air into and out of the pipeline as exemplified by U.S. Pat. Nos. 5,511,577 and 6,513,541. Still certain other of the prior art valves do not allow the ingress of large volumes of air into the pipeline under negative pressure conditions while other valves vent only small amounts of air that accumulate under normal pipeline operations.

Figure 1:
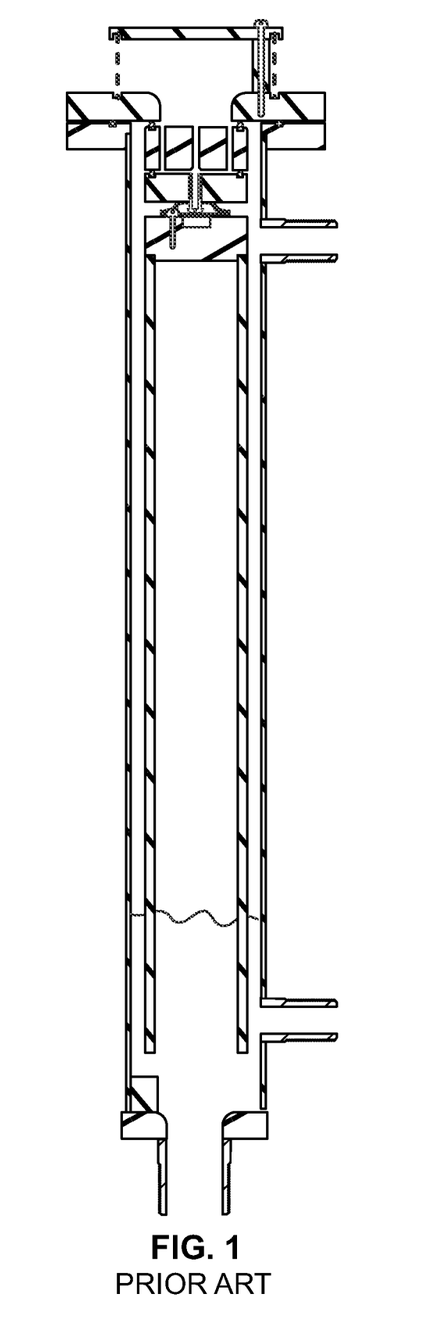
FIG. 1 is a cross-sectional view of a prior art gas vent valve.

During operation of prior art cylindrical type valves such as that described in U.S. Pat. No. 5,511,577, or as depicted in FIG. 1, the normal operating liquid level in the valve is just high enough to supply the control float with sufficient buoyancy so as to apply sufficient pressure to seal some nozzle or gas release mechanism. This creates a "normal gas pocket volume". If the level drops, due to accumulation of additional gases from the pipeline to which the valve is attached, the control float will drop slightly and unseal the nozzle, thus releasing some gas until the liquid level increases to again establish a sealed condition. A similar scenario occurs if the pipeline pressure happens to momentarily drop, which would induce an apparent expansion of the gas pocket that would similarly unseat the nozzle seal. However, when the pipeline pressures surge from a minimum operating design pressure up to the maximum design pressure, this gas pocket will compress (called the "compressed gas pocket volume") in approximate ratio to the two pressures. When this happens, it is desirable to keep the rising liquid surface below the valve's sealing surfaces, so as to prevent debris from inhibiting an effective seal. To ensure a sufficiently tall "compressed gas pocket volume" is still present at this maximum pressure, the ratio of the "normal gas pocket volume" to the "compressed gas pocket volume" needs to approximate the ratio between the minimum and maximum gas pressures. In a valve with a constant cross-section, this geometric requirement results in the valve becoming quite tall, especially with working pressures of 10 or 25 atmospheres.

A problem with tall valves is that these valves are generally installed underground in pipework vaults and manhole covered access chambers that have limited headroom. Due to the limited headroom, engineers can be forced to install vent valves that are shorter and under capacity for the duty required, or may elect to install a vent valve at another, less optimal location.

Figure 2:
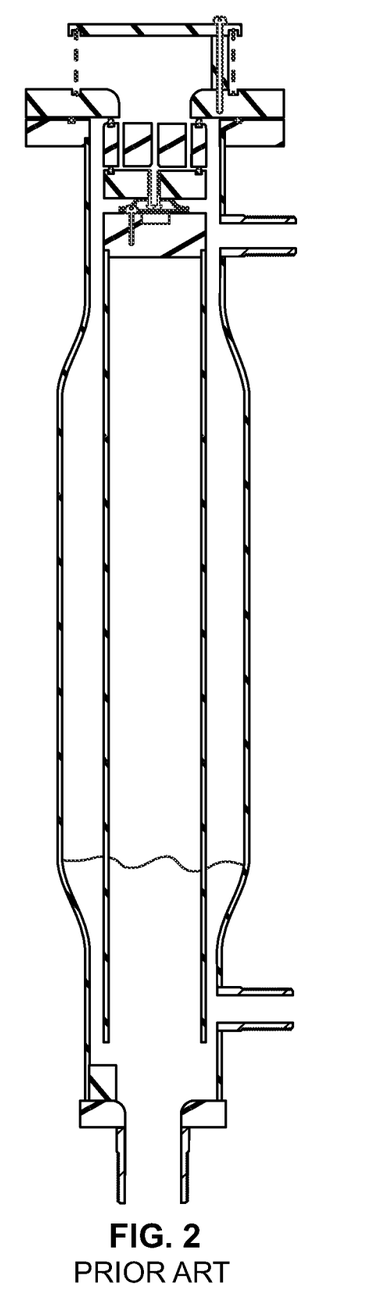
FIG. 2 is a cross-sectional view of a second prior art gas vent valve.

One prior art solution is to replace the straight cylindrical body of the valve with one having a greater internal diameter and then weld on a pipe reducer to the top and bottom as depicted in the prior art valve in FIG. 2. This effectively generates a smaller volume at the top of the valve (where the nozzles and seals are located) and a larger air volume beneath it, and this combination produces a higher maximum pressure valve or enables the valve to be designed shorter. However, this is costly and normally reserved for valves with pressure ratings of 15 bar or above.

Another solution is to utilize a valve that uses internal levers to create some mechanical advantage, rather than depending on direct float buoyancy to affect a seal. While the use of levers can result in a shorter valve, these levers are subject to fouling by debris and breakage.

The prior art thus perceives a need for a gas vent valve that allows gases in large diameter water and sewerage pipelines to be released when the pipeline is pressurized or filled and allows air to enter into the pipeline when the internal pressure of the pipeline drops below atmospheric pressure. Further, the prior art perceives a need for a gas vent valve that can be installed in situations with less headroom and still maintain a high venting capacity and the reliability advantages of direct acting floats and seals.

SUMMARY OF THE INVENTION

In one embodiment, a gas vent valve comprises a valve body having a first end, a second end, and a sidewall having a generally constant inner diameter from the first end to a normal operating liquid level. A control float is positioned within the valve body and a top float is positioned within the valve body, above the control float. A spacer is positioned within the valve body, proximate to the first end of the valve body, and has an aperture formed therethrough configured to receive the top float. A side port extends from the sidewall and is positioned below the spacer and generally adjacent the top float with the valve in the open condition.

In another embodiment, a gas vent valve comprises a valve body having a first end, a second end, and a sidewall having a generally constant inner diameter from the first end to a normal operating liquid level and a flange attached to the first end of the valve body. A control float is positioned within the valve body and a top float is positioned within the valve body, above the control float. A spacer is positioned within the valve body, proximate to the first end of the valve body, and has an aperture formed therethrough configured to receive the top float. A side port is defined by an aperture extending through the flange and the spacer.

In another embodiment, a gas vent valve comprises a valve body having a first end, a second end, and a sidewall having a generally constant inner diameter from the first end to a normal operating liquid level. A spacer is positioned within the valve body, proximate to the first end of the valve body, and has an aperture formed therethrough having an inner diameter. A control float is positioned within the valve body and has an outer diameter that is smaller than the inner diameter of the valve body and larger than the inner diameter of the spacer. A top float is positioned within the valve body, above the control float, and has an outer diameter that is smaller than the inner diameter of the spacer.

In another embodiment, a method of assembling a gas vent valve, comprising the steps of: providing a valve body having a first end, a second end, and a sidewall having a generally constant inner diameter from the first end to a normal operating liquid level; attaching a bottom flange, having an inlet aperture formed therein, to the second end of the valve body; positioning a control float within the valve body; positioning a top float within the valve body, above the control float; inserting a spacer into the valve body proximate the first end of the valve body, the spacer having an aperture corresponding to a desired maximum pressure rating of the gas vent valve and having an inner diameter that is greater than an outer diameter of the top float and less than an outer diameter of the control float; and securing a top flange to the first end of the valve body, the top flange having an outlet aperture corresponding to the desired maximum pressure rating of the gas vent valve.

DETAILED DESCRIPTION

Figure 3:
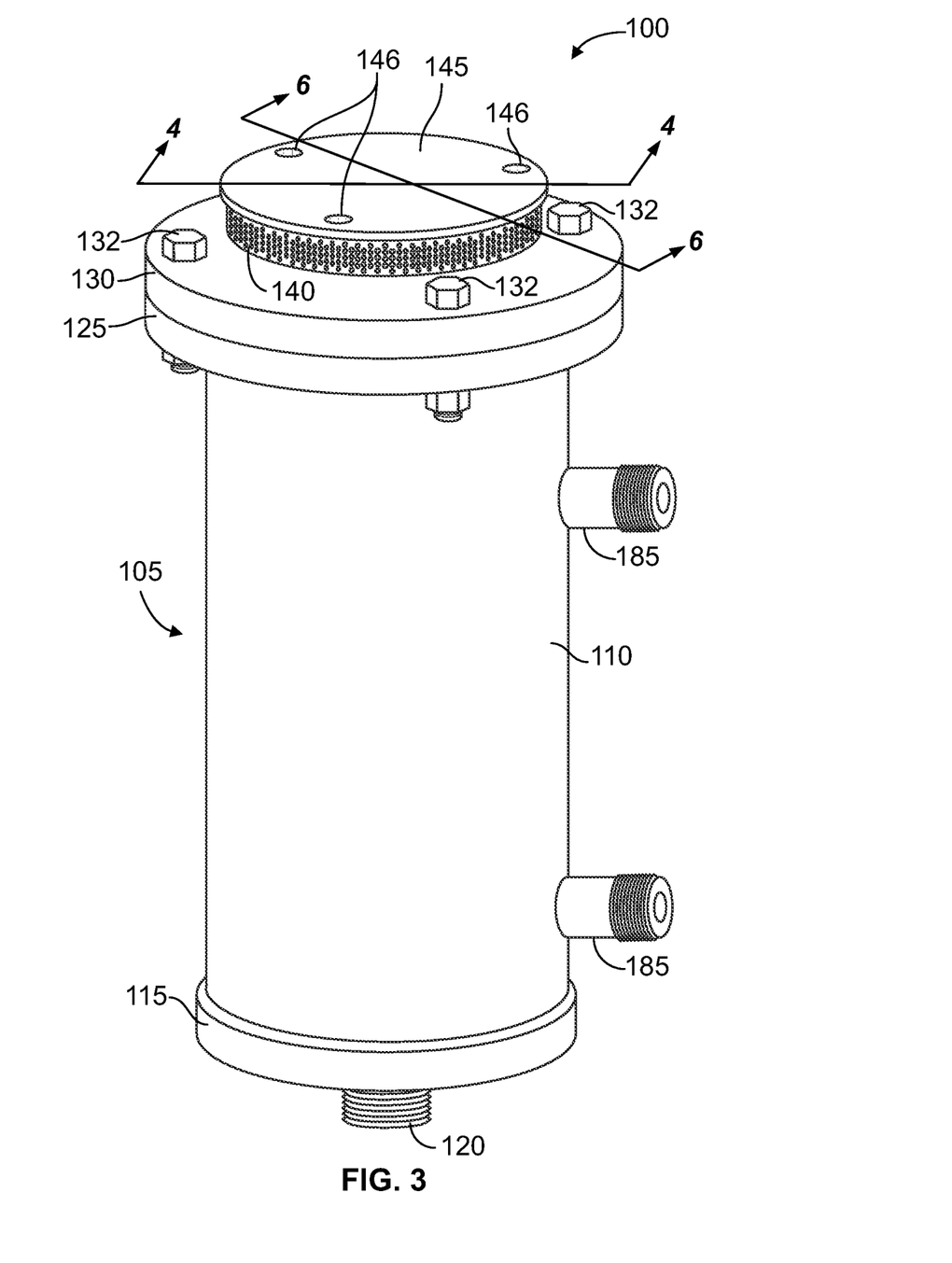
FIG. 3 is a top perspective view of an exemplary gas vent valve.
Figure 4:
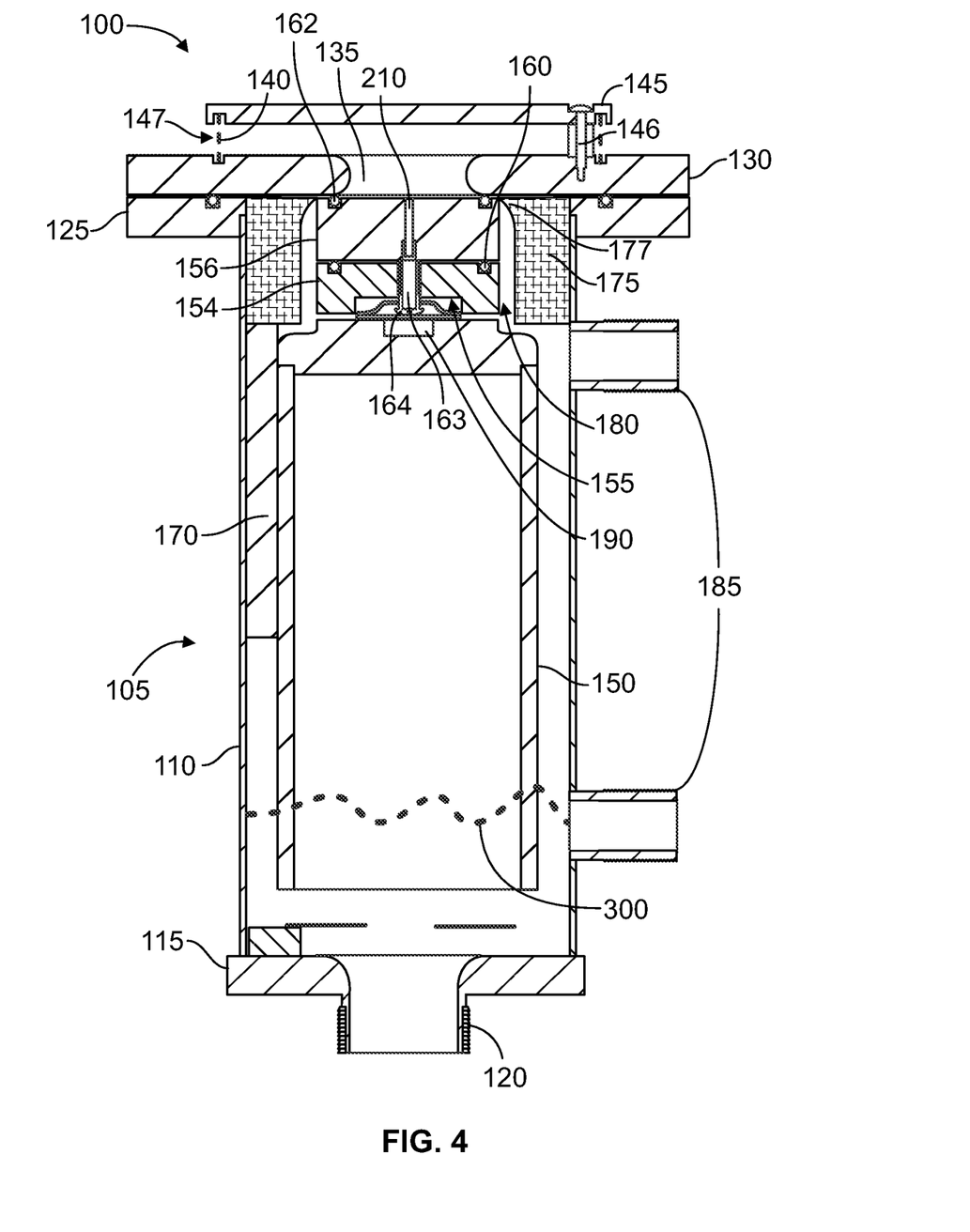
FIG. 4 is a cross-sectional view of the gas vent valve of FIG. 3 taken along line 4-4 with the valve in a sealed condition at minimum working pressure.
Figure 9:
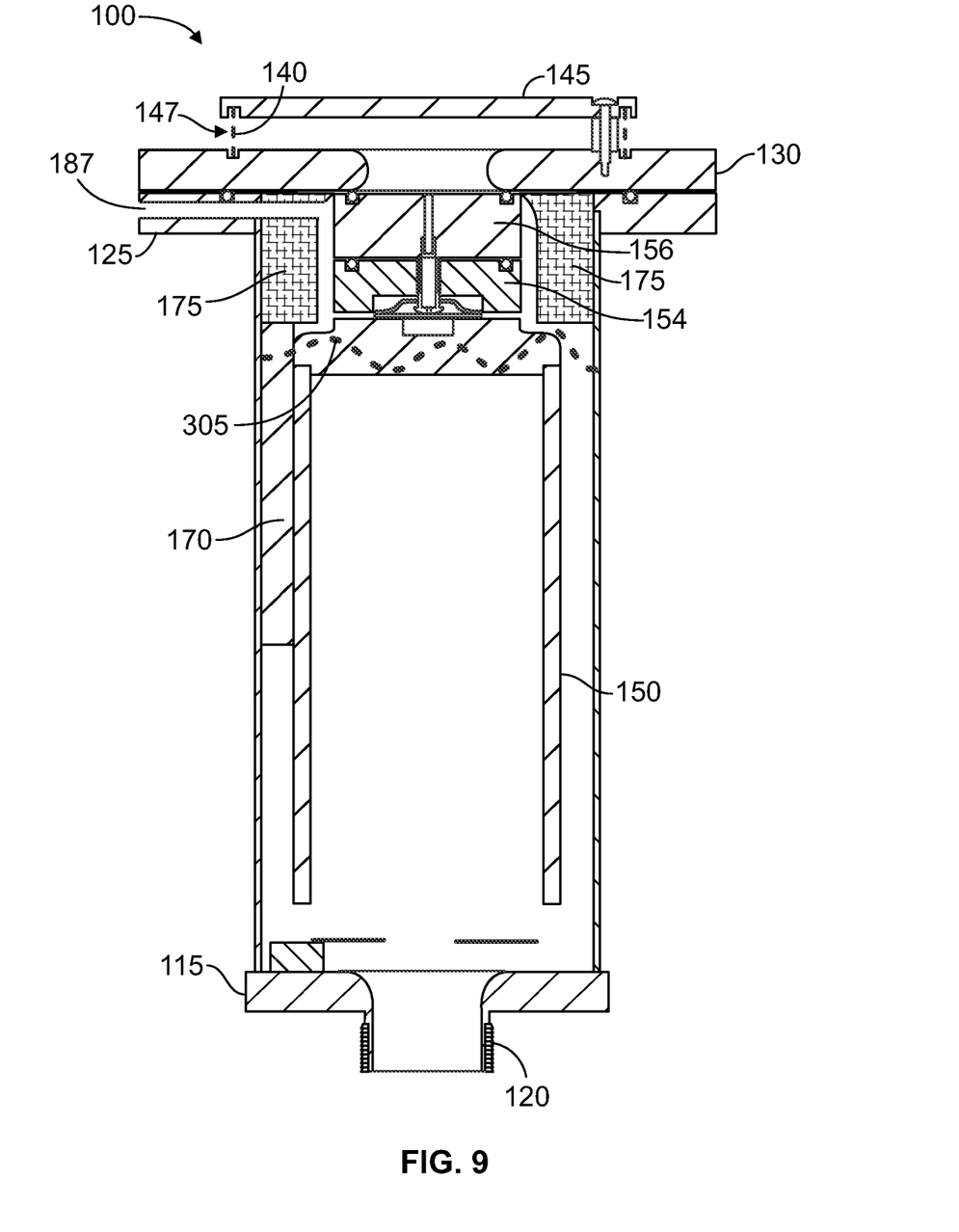
FIG. 9 is a cross-sectional view of a second exemplary gas vent valve.

Referring now to FIGS. 3-8, there is shown an exemplary gas vent valve 100. As seen in FIGS. 3 and 4, gas vent valve 100 includes a generally tubular valve body 105 defined by a generally cylindrical sidewall 110, which has a generally constant inner diameter from the top to the normal operating liquid level 300, which is the liquid level just high enough to supply the control float with sufficient buoyancy so as to apply sufficient pressure to seal the gas release mechanism. At its base, bottom flange 115 is welded or otherwise connected to valve body 105 and has an externally threaded inlet 120 that, when operational, would be connected to a cooperating threaded aperture, port or the like in a pipeline (not shown). Alternatively, rather than an externally threaded inlet 120, bottom flange 115 could use a flanged connection, direct-welding, or integration into the body of an isolating valve, or any other means for connecting the bottom flange to a pipeline that is common in the industry, including a variety of quick-fit connectors. At its other end, a peripheral flange 125 is welded to or otherwise connected to valve body 105 and extends outwardly from sidewall 110. Top flange 130 is attached to peripheral flange 125 through any well known means, such as bolts 132, and has a central opening 135 to allow air to exit and enter gas vent valve 100. Alternatively, opening 135 does not have to be in the center of top flange 130, but can be located anywhere desired according to a particular design. Lid 145 is connected to top flange 130 via screws 146 or similar means, and a generally cylindrical screen wall 140 extends between top flange 130 and lid 145. Screen wall 140 may sit in grooves formed in top flange 130 and lid 145 and forms a screened exhaust 147 that allows the exhaust gases or intake of atmospheric air and prevent debris from entering the gas vent valve 100. In the particular example shown, valve 100 also has two side ports 185 extending from valve body 105 for venting, draining or cleaning. Side ports 185 are off (not shown) during normal operation of gas vent valve 100. Alternatively, instead of or in additional to side ports 185, valve 100 may include an aperture 187 extending through peripheral flange 125 and spacer 175, described later herein, creating a passage or port for venting as depicted in FIG. 9. Side ports 185 provide a mechanism to: flush and/or depressurize the valve; allow access and/or connection points for ancillary equipment functions such as pressure gages and degreasing equipment; and safely ensure an unpressurized condition within the gas vent valve in the event service or disassembly becomes required. Consider the conditions present when the valve is connected to an isolation valve on a pipeline. Engagement of the isolation valve to isolate the gas vent valve could occur during pressurized conditions. In such an occurrence, one, both or all of the side ports may be opened to depressurize the isolated gas vent valve. The upper side port would depressurize from the compressed gas zone while the lower side port would depressurize from the buoyancy zone or the normal gas zone depending on the operational state of the valve as well as pipeline conditions. It is therefore desirable to accommodate these multiple functions that at least one side port be positioned as near the top of the valve body as is practical and at least one other positioned as near to the inlet of the valve as is practical. When used as a drain or other outlet, the lower side port should be sized accordingly while the upper side port should be sized as an inlet for standard attachments.

Gas vent valve 100 further includes a control float 150, a nozzle float 154 positioned above control float 150, and a top float 156, positioned above nozzle float 154, within valve body 105. Guide rods 170 are provided on the inside of sidewall 110 of valve body 105 to axially position control float 150. Control float 150 is cylindrical and includes rubber pad 190, which is located in the center of the top of control float 150. Alternatively, pad 190 does not have to be in the center of control float 150, but can be located anywhere desired in accordance with a particular design, as long as pad 190 is positioned such that it is generally aligned with nozzle 164.

Nozzle float 154 is generally cylindrical and has an inset 155 formed in the bottom of nozzle float 154 to reduce the mass of nozzle float 154, recess nozzle 164, and decrease the "compressed gas pocket volume". Nozzle float 154 also includes o-ring 160 seated in a groove formed on the top of nozzle float 154, which seats against the bottom of top float 156 to provide a seal when gas vent valve 100 is in a sealed condition. O-ring 160 can have a variety of cross-sectional shapes and can be located on the bottom of top float 156 instead of the top of nozzle float 154. An aperture 163 is formed through the center of nozzle float 154 and nozzle 164 is secured within aperture 163. Alternatively, aperture 163 does not have to be in the center of nozzle float 154, but can be located anywhere desired according to a particular design.

During operation, nozzle 164 seats against rubber pad 190 when gas vent valve is in a sealed condition to prevent the escape of air, gas, liquid, or sewage from gas vent valve 100. As the water level within gas vent valve 100 drops, control float 150 will drop and separate nozzle 164 from rubber pad 190 allowing a small amount of air to be exhausted. As the air is exhausted, the water level and control float will rise to seat nozzle 164 against rubber pad 190 and again place gas vent valve 100 in a sealed condition.

Top float 156 is also generally cylindrical and includes an o-ring 162 seated in a groove formed on the top of top float 156, which seats against the bottom of top flange 130 to provide a seal when gas vent valve 100 is in a sealed condition. O-ring 162 can have a variety of cross-sectional shapes and can be located on the bottom of top flange 130 instead of the top of top float 156. A single or plurality of apertures are formed through top float 156 to allow the passage of air during operation. In the example shown, a center aperture 210 is formed through the center of top float 156 and a plurality of outer apertures 215 (see FIG. 6) are formed through top float 156 and are located radially around center aperture 210. However, it is understood that any number, size, and location of apertures can be used according to the requirements of a particular design. Wear inserts 220 are inserted into one end of center aperture 210 and outer apertures 215 as described in U.S. patent application Ser. No. 12/806,414, filed Aug. 12, 2010, and entitled Method and Apparatus for Venting Gas from Liquid-Conveying Conduit, which is incorporated herein in its entirety.

Gas vent valve 100 further includes a generally cylindrical spacer 175 positioned in the upper portion of valve body 105, which has an outer diameter slightly smaller than the inner diameter of sidewall 110. The bottom of spacer 175 rests on the top of guide rods 170 and the top of spacer 175 is adjacent the bottom of top flange 130. Central hole 180 is formed through spacer 175 and has an upper concave fluted portion 177. Central hole 180 is sized to receive nozzle float 154 and top float 156, but is smaller than the outer diameter of control float 150, and spacer 175 has float guides 195 extending into central hole 180 for axially positioning nozzle float 154 and top float 156 and maintaining the desired gap between nozzle float 154 and top float 156 and spacer 175. In the example shown, the cross sectional area of the gap between the spacer 175 and nozzle float 154 and to top float 156 is 5% to 30% greater than the cross sectional area of inlet 120 or central opening 135, whichever is greater. Under vacuum conditions, this allows for progressive expanding gas flow to maintain momentum gained during entry, which helps minimize drag while also keeping the "compressed gas pocket volume" to a minimum. Gaps less than 5% will ultimately permit higher pressure ratios to be achieved, but risk increasing drag by forcing the gas flow to accelerate. While the float guides 195 are shown in the present embodiment as being integral with the spacer 175, it is understood that float guides 195 can be attached separately if desired, or alternatively, guide rods can be attached to the floats so long as the proper gap between the floats and the spacer 175 is maintained. Spacer 175 may also have concave groove 200 to assist the streamlining of gas flow between spacer 175 and nozzle float 154 and top float 156. Under vacuum relief conditions, the air/gas entering the valve through central opening 135 and into central hole 180 is diverted around the top-outer-edge of top float 156 and, in doing so, increases its velocity in the horizontal plane before being turned vertically downwards again. These abrupt changes in flow direction lead to turbulent energy losses, which can be minimized by increasing the width of the gap to provide a larger turning radius. The purpose of locating groove 200 adjacent to the top edge of top float 156 is to provide a larger turning radius for the flow, without needing to further increase the overall gap, which again helps keep the "compressed gas pocket volume" to a minimum. Groove 200 also assists the streamlining of gas flow between the spacer 175 and top float 156 as do rounded internal edges and surfaces of spacer 175. Spacer 175 may be made from any suitable material, such as metals, ceramics or polymers like polyethylene so long as it does not substantially change in volume when under the typical pressures involved in large pipelines of the type contemplated herein.

Figure 7:
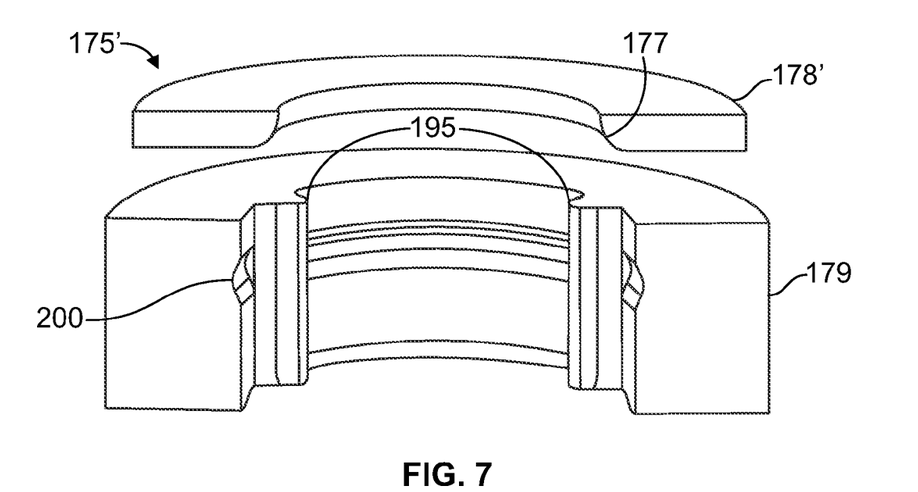
FIG. 7 is an exploded view of an optional multi-part spacer.
Figure 8:
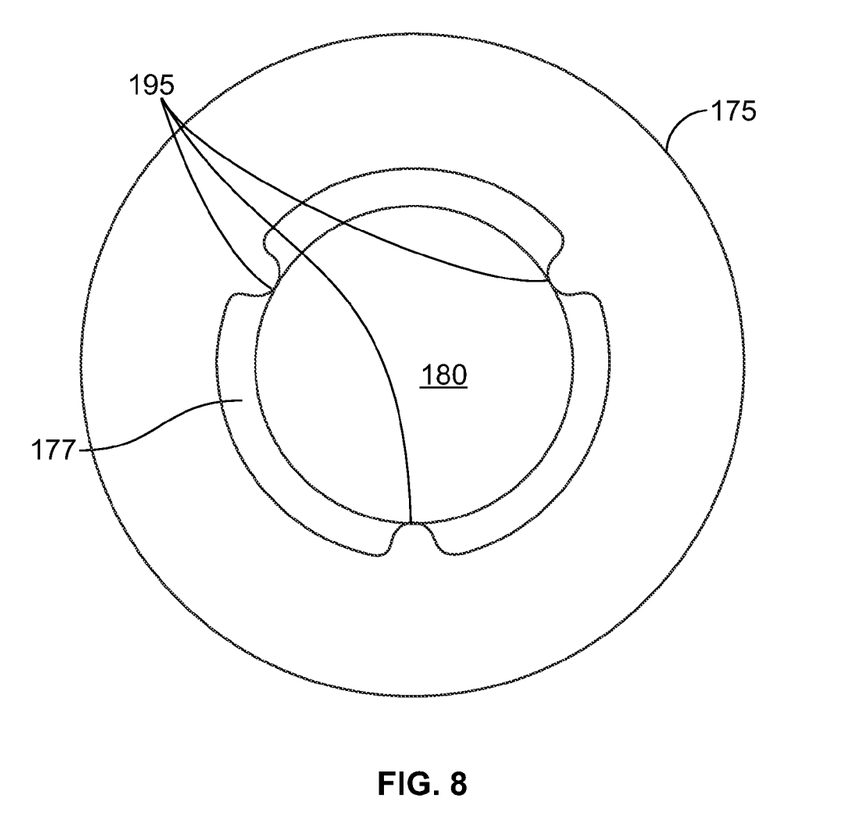
FIG. 8 is a bottom view of a spacer of the gas vent valve of FIG. 3.

As shown in FIGS. 4-6 and 8, spacer 175 is formed as a single integral unit. Alternatively, spacer 175 can be assembled from multiple subparts. For example, as shown in FIG. 7, spacer 175' can be made of two separate parts for ease of manufacture. The lower portion 179 of spacer 175' contains float guides 195 and groove 200 and the upper portion 178 includes the fluted portion 177. While the fluted portion 177 of spacer 175 shown in FIGS. 4-6 and 8 is concave, in the multipart spacer 175', the fluted portion 177 is convex. This shape is possible because of the multiple parts and was found to provide better streamlining of the airflow passing through spacer 175'. Through computer simulated fluid dynamics, it has been determined that while the concave shape would appear to offer better streamlining, it actually induces larger flow vortexes and increases the void volume as gases pass between spacer 175 and top float 156 and through central hole 180 out the screened outlet 147, whereas the convex shape minimizes both.

While the spacer 175 is described herein as having a certain shape, it is understood that the shape of spacer 175 can be optimized for any given valve geometry using a variety of tools available to those of ordinary skill in the art, such as a combination of simulated fluid dynamics and basic optimization methodologies, or automated optimization using genetic algorithms or their AI equivalent.

Furthermore, it is contemplated that the spacer 175 can take many forms, which may include protrusions from the top flange that may be attached or integral to the top flange, bulging gaskets, oversized seals, or bulbous extensions to the guide rods. This list is not intended to be limiting but to convey the concept that those skilled in the art should be able to imagine many variations of spacer 175.

One benefit obtained in the embodiments described herein is a cost effective way to vary and control the performance characteristics of the valve via inexpensive replaceable components. By varying only the cross-sectional area of central opening 135 in top flange 130 and using a spacer 175 and floats 150, 154, 156 that are sized to correspond to the particular central opening, the original performance characteristics of the valve can be determined at assembly or can be changed/adjusted in the field. As the area of opening 135 changes, the corresponding spacer 175 and floats 150, 154, 156 also change. However, the more expensive and difficult to manufacture portions of the valve, such as valve body 105, bottom flange 115, peripheral flange 125, lid 145, screen wall 140, and side ports 185 can all be left the same and standardized while still adjusting the performance of the valve through the inexpensive internal components and top flange. As the area of opening 135 gets smaller, the air flow performance of gas vent valve 100 declines, but the pressure rating increases. As the area of opening 135 gets larger, the air flow performance of gas vent valve 100 increases, but the pressure rating decreases.

The cross-sectional area of opening 135 in top flange 130 can be restricted from a maximum effective area to a minimum effective area. By making a corresponding adjustment to the diameter of central hole 180 in spacer 175 and to the sizes of floats 150, 154, 156, the performance characteristics of the valve can be varied to satisfy a broad range of market requirements. For example, a 2 inch valve that is 25.5 inches tall would use a standard valve body 105, bottom flange 115, peripheral flange 125, lid 145, screen wall 140, and side ports 185. However, using these standard components valves having different maximum pressure ratings can be manufactured. By using a top flange having a central opening of approximately 2.3 inches and corresponding floats and spacer would result in a gas vent valve rated at 10 Bar. By using a top flange having a central opening of approximately 1.7 inches and corresponding floats and spacer would result in a gas vent valve rated at 16 Bar. By using a top flange having a central opening of approximately 1.2 inches and corresponding floats and spacer would result in a gas vent valve rated at 25 Bar. As mentioned above, the top flange and corresponding floats and spacer can be chosen during manufacture to produce a valve with a desired rating. However, the performance characteristics of a valve that has already been installed in the field can also changed easily by merely removing the top flange, spacer, and floats and replacing them with corresponding parts of a different size. This is much easier and cost effective than having to purchase a different valve if it is later determined that a higher or lower rated valve is required for a particular application.

Figure 10:
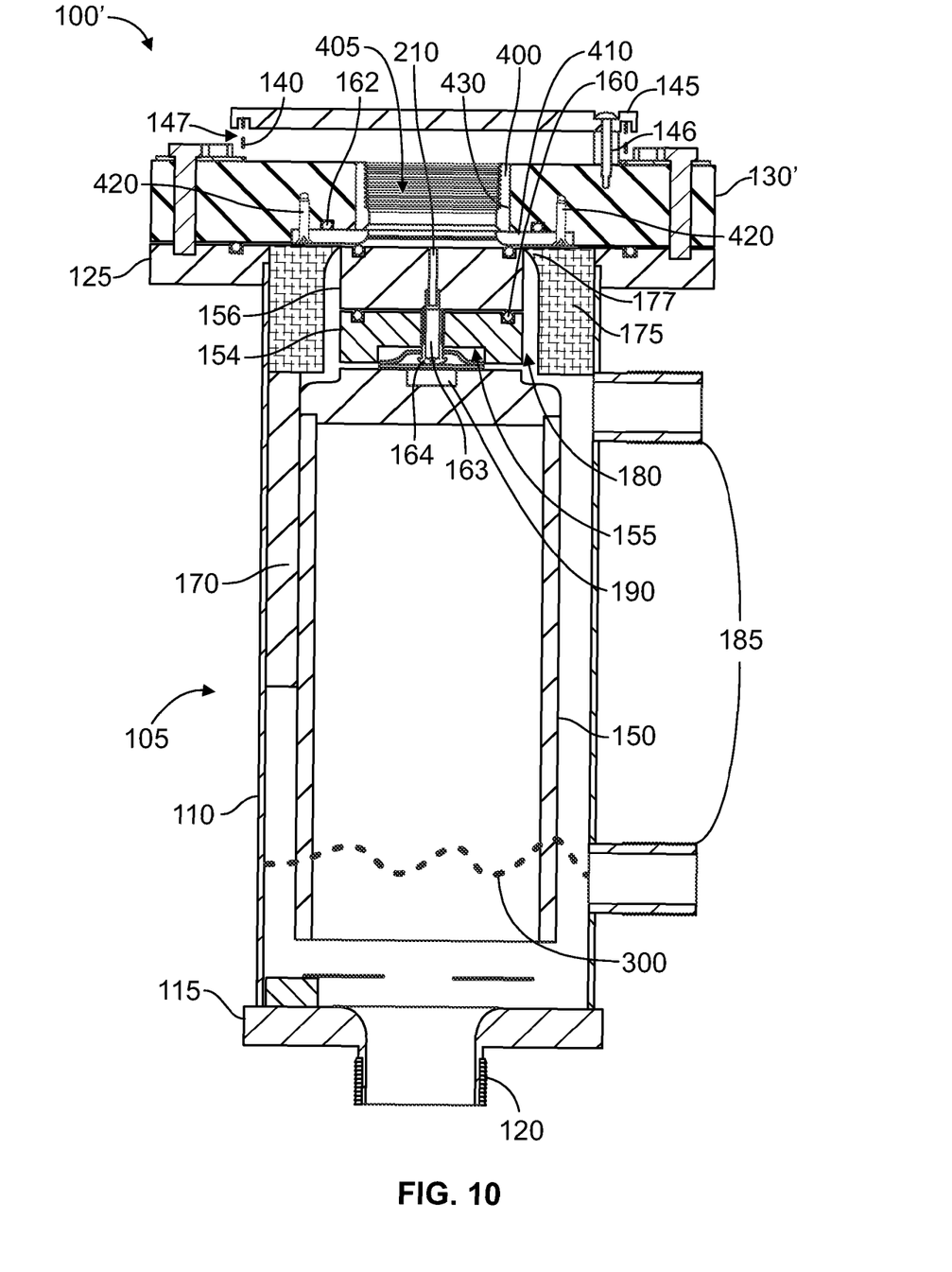
FIG. 10 is a cross-section view of a third exemplary gas vent valve.

Alternatively, rather than having to use different top flanges having different sized central openings, a standard top flange can be used that has an insert positioned in the central opening to control the area of the central opening. Referring to FIG. 10, another exemplary gas vent valve 100' is shown having an alternative top flange 130'. Top flange 130' has a standard sized opening 135 and an insert 400 positioned within opening 135. The opening 405 formed by insert 400 now provides the exhaust area for the gas exiting valve 100' and the exhaust area of valve 100' can be adjusted by using an insert 400 having a different size opening 405. In addition, top flange 130' can also include a plate 410 secured within a cutout formed in the bottom of top flange 130', through the use of screws 420 or any other well known means. Plate 410 can be used to provide a consistent sealing surface for o-ring 162 and have a radiused inside corner 430 to assist with the flow of air exiting valve 100'.

Using an insert 400 with a top flange 130' having a standard sized opening 135 has several benefits. First, insert 400 can be provided with a threaded internal connection, either male or female, which can be used to attach various components to valve 100' or to direct the exhausted gases. This connection is not limited to a threaded connection, but can be any type of connection/attachment method well known to those skilled in the art. Second, insert 400, with or without the threaded connection or other connection/attachment, can be used as a replaceable component to vary and control the performance characteristics of the valve. As described above, when it is desired to adjust the performance characteristics of the valve, the insert 400 would only have to be replaced rather than the entire top flange 130'.

The size of opening 135 in top flange 130 or of opening 405 in insert 400 provides the capability for tradeoff of performance characteristics. When incorporated at the maximum effective outlet size, valve performance will favor air flow over pressure rating and when incorporated at the minimum effective outlet size, valve performance will favor pressure rating over air flow.

The height of gas vent valve 100 can also be varied to control the performance characteristics. However, while possible to adjust in the field by use of extenders, reducers, telescoping bodies, etc., the height of a valve is typically set in the original design. By varying the overall height of the valve body you have the ability to manage the volume available within the "normal gas zone". It should be appreciated that the ratio between the "normal gas zone" and the "compressed gas zone" controls the requisite valve height. By providing the ability to manage the controlling variables that are the "normal gas zone" and "compressed gas zone" we can further control the functional characteristics of air flow, pressure rating and installed height across a myriad of application specific performance requirements.

Referring to FIG. 4, there is depicted a liquid level 300 in gas vent valve 100 that would be typically maintained during normal operation. This normal operating liquid level 300 would provide sufficient buoyancy to raise control float 150 to press rubber pad 190 located in control float 150 to seal against nozzle 164 in nozzle float 154, and in turn raises nozzle float 154 to press against top float 156 and top float 156 to press against top flange 130 creating a seal at the o-rings 160, 162, thus creating the "normal gas pocket volume". Under these conditions, gas vent valve 100 is in a sealed condition and once the valve is pressurized to its minimum operating pressure, gases would not normally escape through the screened exhaust 147. If additional gases enter the inlet 120 from the pipeline to which it is attached, then the liquid level in the valve will drop slightly reducing the buoyancy force both on the control float 150 and on the sealing surfaces of the o-rings 160, 162 and nozzle 164, wherein nozzle 164 will unseal and allow a similar quantity of gas to pass through nozzle float 154 and top float 156, thus allowing the liquid level to rise and cause nozzle 164 to again reseal.

The minimum pressure under which this process operates is called the valves minimum working pressure and is normally 0.1 to 0.5 atmospheres greater than the atmospheric pressure. The maximum designed working pressure of the valve normally ranges between 10 and 25 atmospheres in waste-water applications and up to approximately 40 atmospheres in water valves.

Figure 5:
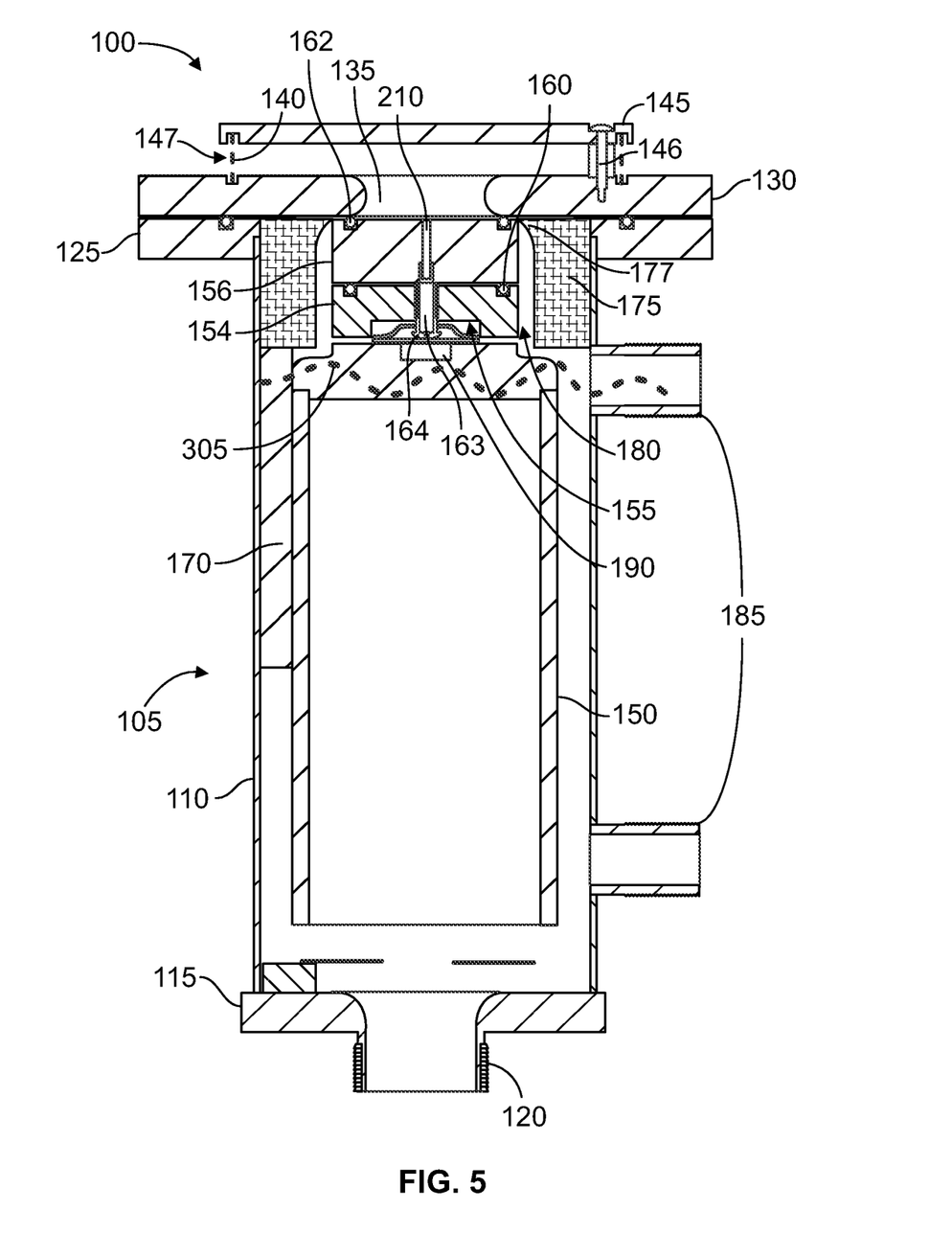
FIG. 5 is a cross-sectional view of the gas vent valve of FIG. 3 taken along line 4-4 with the valve in a sealed condition at maximum designed working pressure.
Figure 6:
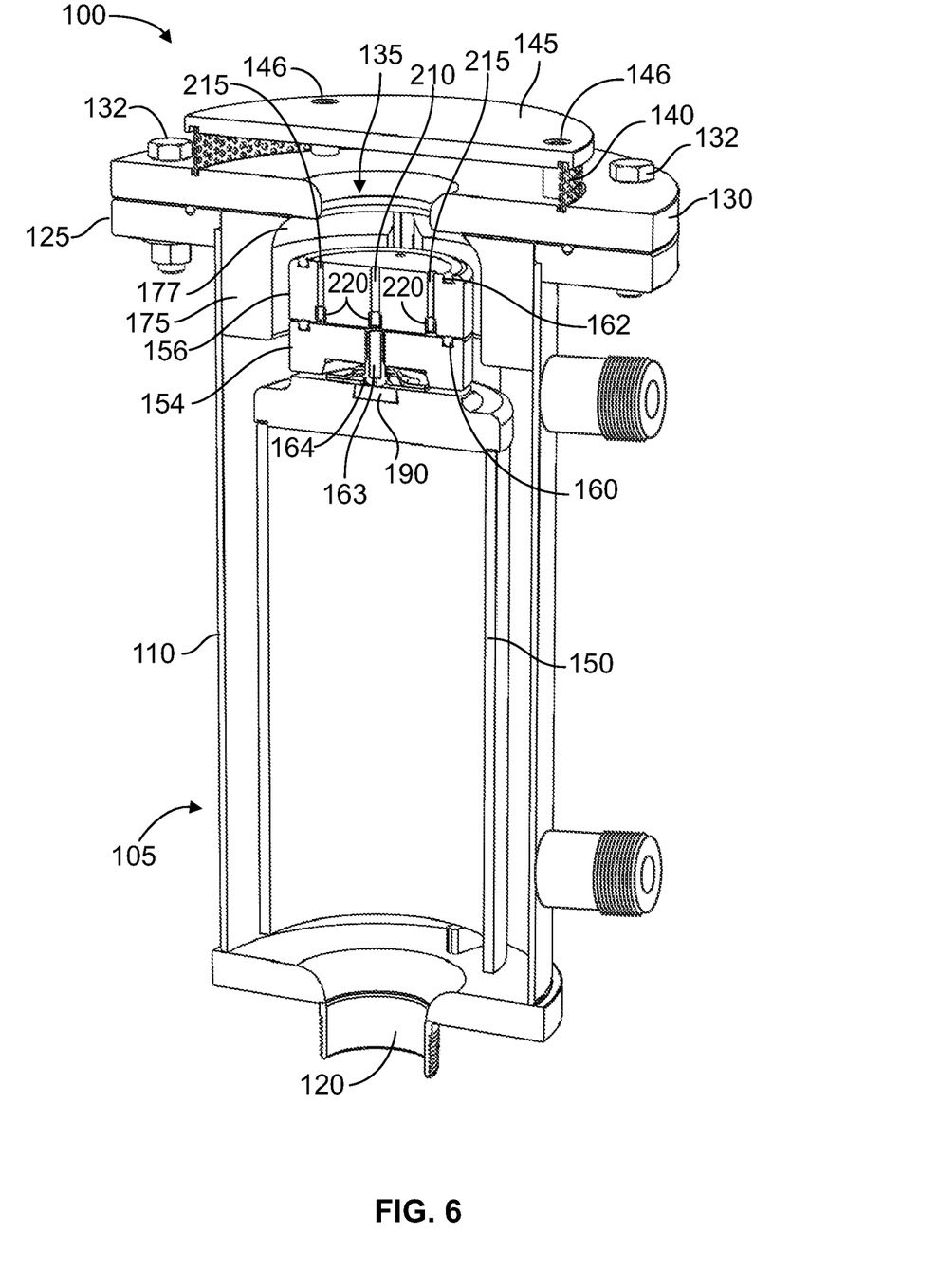
FIG. 6 is a perspective cross-sectional view of the gas vent valve of FIG. 3 taken along line 6-6 with the valve in an open condition.

If no additional air enters gas vent valve 100, then the liquid level 305, depicted in FIG. 5, would be the maximum level that debris-containing water can be allowed to rise inside gas vent valve 100. This would occur when the pipeline increases from the minimum to the maximum pressure. If the liquid level rises any further, there is a risk that debris will foul the sealing surfaces and result in valve leakage. The resulting air pocket below top flange 130 and above maximum liquid level 305 is referred to as the "compressed gas pocket volume" and the air pocket between top flange 130 and normal liquid level 300 is referred to as the "normal gas pocket volume". The ratio of these two gas pocket volumes equates to the ratio between the minimum and maximum working pressures of the valve 100, e.g., a valve rated at 10 atmospheres needs the "normal gas volume pocket" to be at least 10 times larger than the "compressed gas pocket volume" and with a reasonably constant clearance between valve body 105, nozzle float 154, and top float 156. This normally results in a valve with a tall profile as depicted in the prior art valve in FIG. 1. An alternative design philosophy may be applied to larger valves where the restricting diameter of the nozzle is greater than 3 to 5 mm and has less risk of blockage, wherein liquid level 305 is computed to be slightly below the lowest o-ring or sensitive sealing surfaces.

Gas vent valve 100 modifies the gas volume ratio between the "normal" and the "compressed" zones within gas vent valve 100. Spacer 175 reduces the volume within gas vent valve 100 below top flange 130 and above maximum liquid level 305 that would otherwise contribute to the "compressed gas pocket volume." By using spacer 175 located in the upper portion of valve body 105 the volume into which the gas pocket can be compressed is limited. Doing so allows the valve body 105 to be constructed of a wider diameter tube or pipe, thus increasing the "normal gas pocket volume" that fills valve body 105 during normal or low pressure operation. With this design, the pipeline pressure would need to increase to a greater extent to force the liquid level to rise to a level just below nozzle 164 because the upper region of valve body 105 into which the gas can be compressed is much reduced due to the insertion of spacer 175. Thus, using spacer 175 in a prior art valve such as the one depicted in FIG. 1 without further changes to the outer dimensions of valve creates a vent valve of original height with a higher design working pressure rating, which assumes of course the strength of other valve components are compatible with that higher rating.

Furthermore, using spacer 175 as described above, allows one to shorten valve body 105 to approximately half the height while maintaining that same maximum working pressure. Shortening the height of valve body 105 in turn shortens control float 150, and in order to maintain a desirable minimum buoyancy force, necessitates the use of a larger diameter float, and thus a larger diameter valve body 105 to contain it. This results in a considerably shorter, wider valve, with little to no compromise in venting capacity or mechanical reliability from the base design, while affording substantially improved product integrity and simplicity in manufacture.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications that fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The invention claimed is:

1. A gas vent valve, comprising:
a valve body having a first end, a second end, and a sidewall having a generally constant inner diameter from the first end to a normal operating liquid level;
a control float positioned within the valve body;
a top float positioned within the valve body, above the control float;
a spacer positioned within the valve body, proximate to the first end of the valve body, the spacer having an aperture formed therethrough configured to receive the top float; and
a side port extending from the sidewall, the side port positioned below the spacer and generally adjacent the top float with the valve in the open condition,
wherein the top float comprises an aperture formed therethrough,
wherein the aperture is formed through the center of the top float and a plurality of outer apertures are formed through the top float and located radially outward from the aperture, and,
comprising wear inserts positioned within each of the aperture and the outer apertures.

2. The gas vent valve of claim 1, wherein the control float has an outer diameter that is larger than the aperture through the spacer.

3. The gas vent valve of claim 1, further comprising:
a top flange connected to the first end of the valve body, the top flange having an opening formed therethrough;
wherein a cross-sectional area of a gap between the top float and the spacer is 5-30% greater than a cross-sectional area of the opening.

4. The gas vent valve of claim 1, further comprising:
a top flange connected to the first end of the valve body, the top flange having a first opening formed therethrough; and
an insert positioned with the first opening, the insert having a second opening formed therethrough;
wherein a cross-sectional area of a gap between the top float and the spacer is 5-30% greater than a cross-sectional area of the second opening.

5. The gas vent valve of claim 1, wherein the spacer comprises a plurality of float guides extending into the aperture.

6. The gas vent valve of claim 1, wherein the aperture through the spacer comprises a convex fluted portion.

7. The gas vent valve of claim 1, wherein the side port is positioned below the spacer and generally adjacent a top portion of the control float with the valve in a sealed condition.

8. The gas vent valve of claim 1, further comprising a nozzle float positioned within the valve body, between the control float and the top float.

9. The gas vent valve of claim 8, wherein:
the nozzle float comprises an aperture formed through the nozzle float and a nozzle positioned within the aperture; and
the control float comprises a rubber pad positioned to engage the nozzle with the gas vent valve in a sealed condition.

10. A gas vent valve, comprising:
a valve body having a first end, a second end, and a sidewall having a generally constant inner diameter from the first end to a normal operating liquid level;
a spacer positioned within the valve body, proximate to the first end of the valve body, the spacer having an aperture formed therethrough having an inner diameter;
a control float positioned within the valve body, the control float having an outer diameter that is smaller than the inner diameter of the valve body and larger than the inner diameter of the spacer; and
a top float positioned within the valve body, above the control float, the top float having an outer diameter that is smaller than the inner diameter of the spacer,
wherein the top float comprises an aperture formed therethrough,
wherein the aperture is formed through the center of the top float and a plurality of outer apertures are formed, through the top float and located radially outward from the aperture, and,
comprising wear inserts positioned within each of the aperture and the outer apertures.

11. The gas vent valve of claim 10, further comprising:
a top flange connected to the first end of the valve body, the top flange having an opening formed therethrough;
wherein a cross-sectional area of a gap between the top float and the spacer is 5-30% greater than a cross-sectional area of the opening.

12. The gas vent valve of claim 10, further comprising:
a top flange connected to the first end of the valve body, the top flange having an first opening formed therethrough; and
an insert positioned with the first opening, the insert having a second opening formed therethrough;

wherein a cross-sectional area of a gap between the top float and the spacer is 5-30% greater than a cross-sectional area of the second opening.

13. The gas vent valve of claim 10, wherein the spacer comprises a plurality of float guides extending into the aperture.

14. The gas vent valve of claim 10, wherein the aperture through the spacer comprises a convex fluted portion.

15. A gas vent valve, comprising:
a valve body having a first end, a second end, and a sidewall having a generally constant inner diameter from the first end to a normal operating liquid level;
a control float positioned within the valve body;
a top float positioned within the valve body, above the control float;
a spacer positioned within the valve body, proximate to the first end of the valve body, the spacer having an aperture formed therethrough configured to receive the top float; and
a side port extending from the sidewall, the side port positioned below the spacer and generally adjacent the top float with the valve in the open condition; and
a top flange connected to the first end of the valve body, the top flange having an opening formed therethrough;
wherein a cross-sectional area of a gap between the top float and the spacer is 5-30% greater than a cross-sectional area of the opening.

16. The gas vent valve of claim 10, further comprising a nozzle float positioned within the valve body, between the control float and the top float.

17. The gas vent valve of claim 16, wherein an outer diameter of the nozzle float is smaller than the inner diameter of the spacer.

18. The gas vent valve of claim 17, wherein:
the nozzle float comprises an aperture formed through the nozzle float and a nozzle positioned within the aperture; and
the control float comprises a rubber pad positioned to engage the nozzle with the gas vent valve in a sealed condition.

19. A gas vent valve, comprising:
a valve body having a first end, a second end, and a sidewall having a generally constant inner diameter from the first end to a normal operating liquid level;
a spacer positioned within the valve body, proximate to the first end of the valve body, the spacer having an aperture formed therethrough having an inner diameter;
a control float positioned within the valve body, the control float having an outer diameter that is smaller than the inner diameter of the valve body and larger than the inner diameter of the spacer;
a top float positioned within the valve body, above the control float, the top float having an outer diameter that is smaller than the inner diameter of the spacer; and
a top flange connected to the first end of the valve body, the top flange having an opening formed therethrough;
wherein a cross-sectional area of a gap between the top float and the spacer is 5-30% greater than a cross-sectional area of the opening.

\* \* \* \* \*